United States Patent [19]

Forgash et al.

[11] Patent Number: 5,242,289
[45] Date of Patent: Sep. 7, 1993

[54] APPARATUS FOR PROVIDING CONTROLLED COOLING OF THERMOPLASTIC STRANDS

[75] Inventors: Anthony R. Forgash; Richard H. Fetter, Jr., both of Bay City, Mich.; Richard O. Alguire, Gloucester, Mass.; Henry E. Richardson, Gladwin, Mich.

[73] Assignee: The Conair Group, Inc., Pittsburgh, Pa.

[21] Appl. No.: 963,372

[22] Filed: Oct. 20, 1992

[51] Int. Cl.⁵ .............................. B29C 35/16
[52] U.S. Cl. ........................... 425/71; 34/155; 165/138; 264/38; 264/40.6; 264/143; 264/237; 425/143; 425/308; 425/445
[58] Field of Search ............... 34/154, 155; 137/560; 165/108, 132, 138; 264/38, 40.6, 143, 145, 169, 178 F, 180, 237; 425/66, 67, 68, 69, 70, 71, 84, 85, 86, 143, 215, 216, 217, 308, 377, 378.1, 378.2, 379.1, 445

[56] References Cited

U.S. PATENT DOCUMENTS

| | | | |
|---|---|---|---|
| 1,740,029 | 12/1929 | Moomy | 264/237 |
| 2,975,483 | 3/1961 | Cooper et al. | 264/143 |
| 3,988,085 | 10/1976 | Krchma | 425/71 |
| 4,025,252 | 5/1977 | Hunke | 425/71 |
| 4,180,539 | 12/1979 | Clarke | 425/71 |
| 4,528,157 | 7/1985 | Lettner et al. | 425/71 |
| 4,530,649 | 7/1985 | Phillipp et al. | 425/378.2 |
| 4,632,752 | 12/1986 | Hunke | 425/71 |
| 4,783,291 | 11/1988 | Pagan | 425/71 |
| 4,913,899 | 4/1990 | Hartig | 425/71 |
| 5,118,270 | 6/1990 | Keilert et al. | 425/308 |

FOREIGN PATENT DOCUMENTS

| | | | |
|---|---|---|---|
| 535503 | 2/1955 | Belgium . | |
| 0086400 | 8/1983 | European Pat. Off. . | |
| 1323888 | 3/1963 | France . | |
| 61-148006 | 7/1986 | Japan | 425/308 |
| 61-189908 | 8/1986 | Japan | 264/143 |
| 62-270306 | 11/1987 | Japan | 425/308 |
| 63-216710 | 9/1988 | Japan | 425/308 |

Primary Examiner—Scott Bushey
Attorney, Agent, or Firm—Buchanan Ingersoll; George Raynovich, Jr.

[57] ABSTRACT

Apparatus is provided for controlled cooling of thermoplastic strands between the time that they are extruded from a melt of thermoplastic material until they are cut into pellets by a pelletizer that pulls the strands into it. A first tray inclined downwardly from the extruder receives the strands which are sprayed with cooling liquid while in the tray. A second tray inclined upwardly from the bottom of the first tray toward the pelletizer receives the strands which are also sprayed while in the second tray. Cooling liquid is also introduced at the inlet end of the first tray. A gravity liquid removal screen is positioned at the low point of each tray to remove the cooling liquid from the trays. A vacuum system for removing cooling liquid from the strands may also be positioned between the higher end of the second tray and the pelletizer. The temperature and quantity of the cooling liquid sprayed on the first tray, that sprayed on the second tray, and that introduced at the inlet end of the first tray are individually controlled by a cooling liquid control system utilizing a programmable central micro-processor.

20 Claims, 3 Drawing Sheets

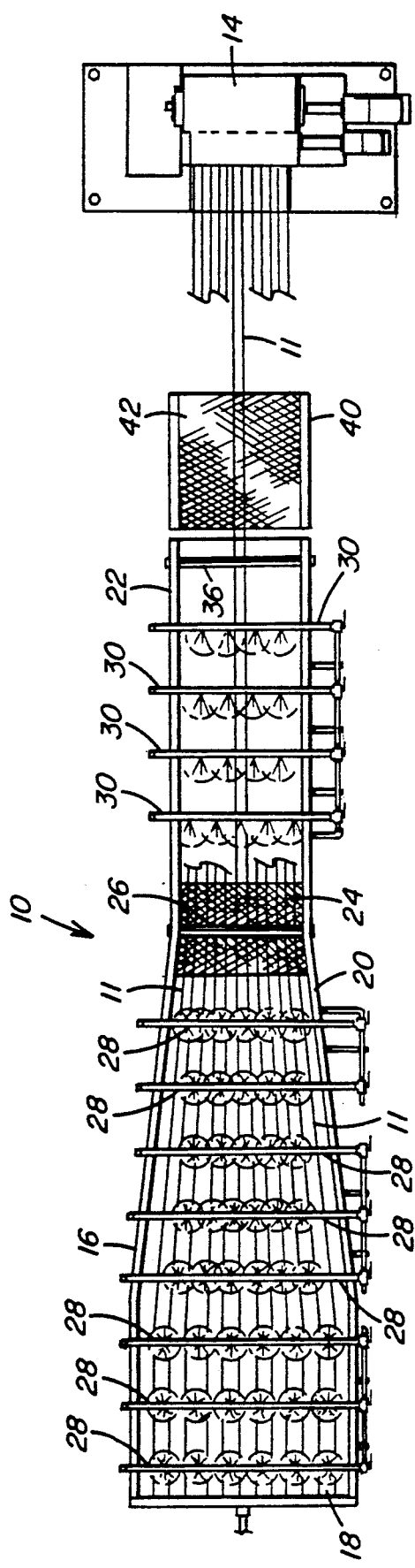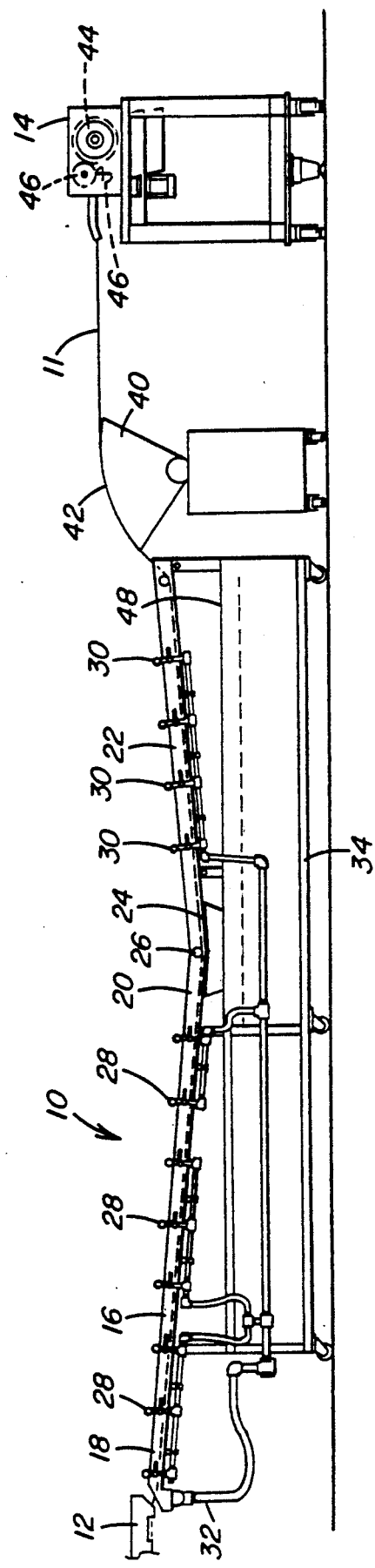

APPARATUS FOR PROVIDING CONTROLLED COOLING OF THERMOPLASTIC STRANDS

1. FIELD OF THE INVENTION

This invention relates to apparatus for providing controlled cooling of thermoplastic strands as they move to a pelletizer after having been extruded from a thermoplastic melt.

2. DESCRIPTION OF THE PRIOR ART

The present invention is directed to an apparatus for providing controlled cooling of plastic strands after they are extruded from a plastic melt and before they are cut into short sections to produce pellets that serve as raw material for subsequent manufacture of plastic articles. It has been recognized that it is desirable to cool the plastic strands before they are cut by the pelletizer in order to provide a uniform product after the pellets are cut. If the plastic strands do not have the proper consistency, the finished product will not be uniform, cannot be reliably used in further plastic production, and the pellets will not be properly separated and cylindrical in shape.

Various apparatus for cooling the strands as they are moved from the extruder to the pelletizer have been demonstrated in the prior art. These devices include water baths, water slides, and various combinations of cooling arrangements.

U.S. Pat. No. 3,988,085, U.S. Pat. No. 4,025,252, U.S. Pat. No. 4,180,539, U.S. Pat. No. 4,528,157, U.S. Pat. No. 4,632,752, U.S. Pat. No. 4,783,291, U.S. Pat. No. 4,913,899, French Patent 1,323,888 and Belgium Patent 535,503 are all examples of apparatus for conveying and cooling plastic material that is ultimately comminuted into small pieces after being extruded from a plastic melt.

While many attempts have been made to successfully cool plastic strands before they are cut into small lengths in a pelletizer, no prior devices have provided the controlled cooling required for successful pelletization as disclosed in this specification.

SUMMARY OF THE INVENTION

In accordance with the present invention, there is provided apparatus for controlled cooling of thermoplastic strands as they move to a pelletizer. The apparatus includes a first inclined tray for receiving a plurality of side-by-side thermoplastic strands as those strands are discharged from an extruder. The first tray is inclined downwardly away from the extruder. A second inclined tray is provided in end-to-end relationship with the first tray and extends upwardly from the lower end of the first tray toward the pelletizer.

Hold down means are provided at the intersection of the first and second inclined trays to position the strands in the trays as the strands move down the first tray and then up the second tray. A pelletizer is provided that has means to pull the thermoplastic strands through the first and second trays and into the pelletizer where the pelletizer cuts the strands into pellets. A first plurality of cooling liquid sprays sprays cooling liquid onto the strands as they pass through the first tray. A second plurality of cooling liquid sprays sprays cooling liquid onto the strands as they pass through the second tray. The first plurality of sprays and the second plurality of sprays each utilize cooling liquid whose temperature is independently controlled by a cooling liquid control system. A gravity screen for removing cooling liquid is located in the low ends of the first and second inclined trays.

Further in accordance with the present invention, the cooling liquid control system includes a reservoir, conduits to deliver cooling liquid from the reservoir to the various sprays, separately controllable heat exchangers located in each of the conduits that deliver cooling liquid to the sprays, separately controllable heaters located in the conduits that deliver cooling liquid to the sprays, separately controllable liquid control valves to control the quantity of liquid flowing through each of the delivery conduits, separate temperature responsive thermocouples to determine the water temperature in each of the separate delivery conduits, and a central micro-processor that is programmable to control individually each of the heat exchangers, each of the heaters, and each of the liquid quantity control valves to control the temperature of the water in response to the thermocouples and to control the quantity of water flowing through the delivery conduits to the sprays.

Accordingly, a principal object of the present invention is to provide apparatus for controlled cooling of thermoplastic strands as they move between an extruder and a pelletizer.

Another object of the present invention is to provide cooling of plastic strands with sprays of cooling liquid having the temperature and the quantity of the cooling liquid closely controlled.

These and other objects of the present invention will be more completely disclosed and described in the following specification, the accompanying drawings, and the appended claims.

BRIEF DESCRIPTION OF THE DRAWINGS

FIG. 2 is a top plan view of the apparatus of FIG. 1.

FIG. 3 is a side elevation of the apparatus of FIGS. 1 and 2.

DESCRIPTION OF THE PREFERRED EMBODIMENT

Figure 1:
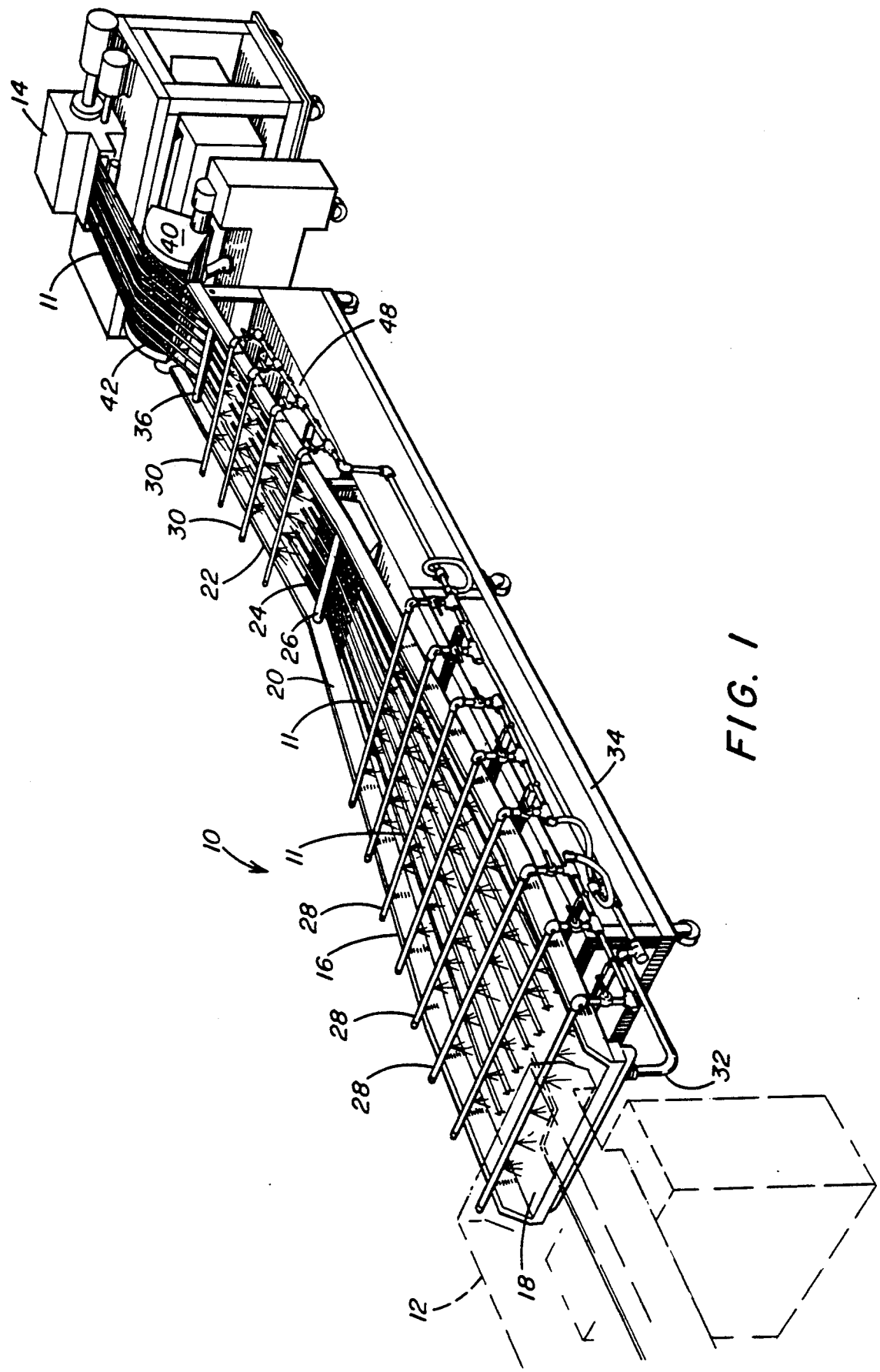
FIG. 1 is a perspective view of the apparatus of the present invention being utilized to cool plastic strands as they move between an extruder and a pelletizer.

Referring to the drawings and particularly FIGS. 1, 2, and 3, an apparatus 10 for providing controlled cooling of thermoplastic strands 11 is shown. The strands 11 are extruded from a thermoplastic melt by an extruder 12 through a die in a well known manner which forms no part of the present invention. The extruded strands 11 are ultimately cut into short sections to provide cylindrical pellets by the pelletizer 14.

The apparatus 10 has a first inclined tray 16 which is preferably formed of metal and has a flat bottom and upwardly extending sides. The tray 16 receives strands 11 from the extruder 12 at the inlet end 18 of tray 16. The tray 16 is inclined downwardly from the extruder at an angle to the horizontal of from 3° to 15°, inclusive, and preferably at an angle of approximately 5°. As may be best seen in FIGS. 1 and 2, the inlet end 18 of tray 16 is substantially wider than the outlet end 20 of tray 16. As the strands enter the tray, they are more widely separated from each other and then the distance between them is reduced as they progress along the tray 16.

A second inclined tray 22 is provided at the outlet end 20 of tray 16 and tray 22 joins to, and communicates with, tray 16. Inclined tray 22 is also preferably formed from metal having a flat bottom and upstanding sidewalls. The width of tray 22 is preferably uniform throughout its length. Tray 22 extends upwardly from the low point of tray 16 toward pelletizer 14 as may best be seen in FIG. 3. Tray 22 is inclined from the horizontal at an angle of from 3° to 15°, inclusive, and preferably at an angle of approximately 5°.

A gravity liquid removal screen 24 replaces the bottom of the lower ends of tray 16 and tray 22. Being at the lowest point in the respective trays 16 and 22, the screen 24 enables liquid to pass from the trays at that point and be collected for reuse. Above the gravity liquid removal screen 24 at the point where tray 16 ends and tray 22 moves upwardly, a hold down bar 26 extends across the intersection of the two trays to position the strands 11 down in the trays as they are pulled through the trays 16 and 22.

A first plurality of cooling liquid sprays 28 are positioned above the first inclined tray 16. In most cases, the cooling liquid will be water. For purposes of this specification, water will be described as being the cooling liquid for ease of description, however it should be understood that in some instances, it may be preferable to use other types of cooling liquid, depending upon the composition of the thermoplastic material being extruded and pelletized. The first plurality of cooling water sprays 28 have their respective nozzles directed so that the cooling spray are perpendicular to the direction of movement of strands 11 as they pass through the tray 16.

A second plurality of cooling water sprays 30 are positioned above the second tray 22. The second plurality of sprays 30 have their nozzles positioned so that they sprays are directed against the direction of travel of the strands 11 to enhance cooling of the strands since they are moving in one direction and the water sprays direct the water against them at an angle opposed to their direction of motion.

A water inlet conduit 32 introduces water into the first inclined tray 16 at its inlet end 18 below the strands 11 so that water introduced through conduit 32 moves down the inclined tray 16 and assists in cooling the strands shortly after they leave the extruder. The trays 16 and 22 are supported by a supporting frame 34 which may be on wheels for ease of positioning but need not have wheels attached. At the upper end of inclined tray 22, a hold down bar 36 is provided to keep the strands 11 positioned within tray 22 as the strands leave the tray 22.

Between the end of tray 22 and the pelletizer 14 may be located a vacuum water removal unit 40 which is commonly referred to as an "air knife." The vacuum water removal unit 40 includes a top screen 42 over which strands 11 pass. In well known fashion, a vacuum pump is provided to reduce the atmospheric pressure below the screen 42 to thereby cause air to flow from above screen 42 to below the screen and to carry with it water droplets which may be on the strands 11 after they leave tray 22. Depending upon the type of material to be pelletized in pelletizer 14, it may be desirable to omit the vacuum water removal unit 40 and move the strands 11 directly from tray 22 to pelletizer 14.

As best seen in FIG. 3, pelletizer 14 includes conventional cylindrical cutter knife 44 and nip rolls 46 adjacent the cutter knife 44. As is well known, the nip rolls receive strands 11 and draw the strands into the pelletizer unit so that they reach the cylindrical cutter 44. The nip rolls 46 provide the motive power to draw the strands 11 through first tray 16, second tray 22, and over the screen 42 of vacuum water removal unit 40. The pellets cut by pelletizer 14 are transported for use as raw material in the subsequent production of plastic articles.

Located below inclined tray 22 is a water reservoir 48 which receives the water passing through the gravity water removal screen 24 and which may also receive the water removed in vacuum water removal unit 40. The reservoir 48 is shown schematically in FIG. 4 as part of the control system for the cooling water.

Figure 4:
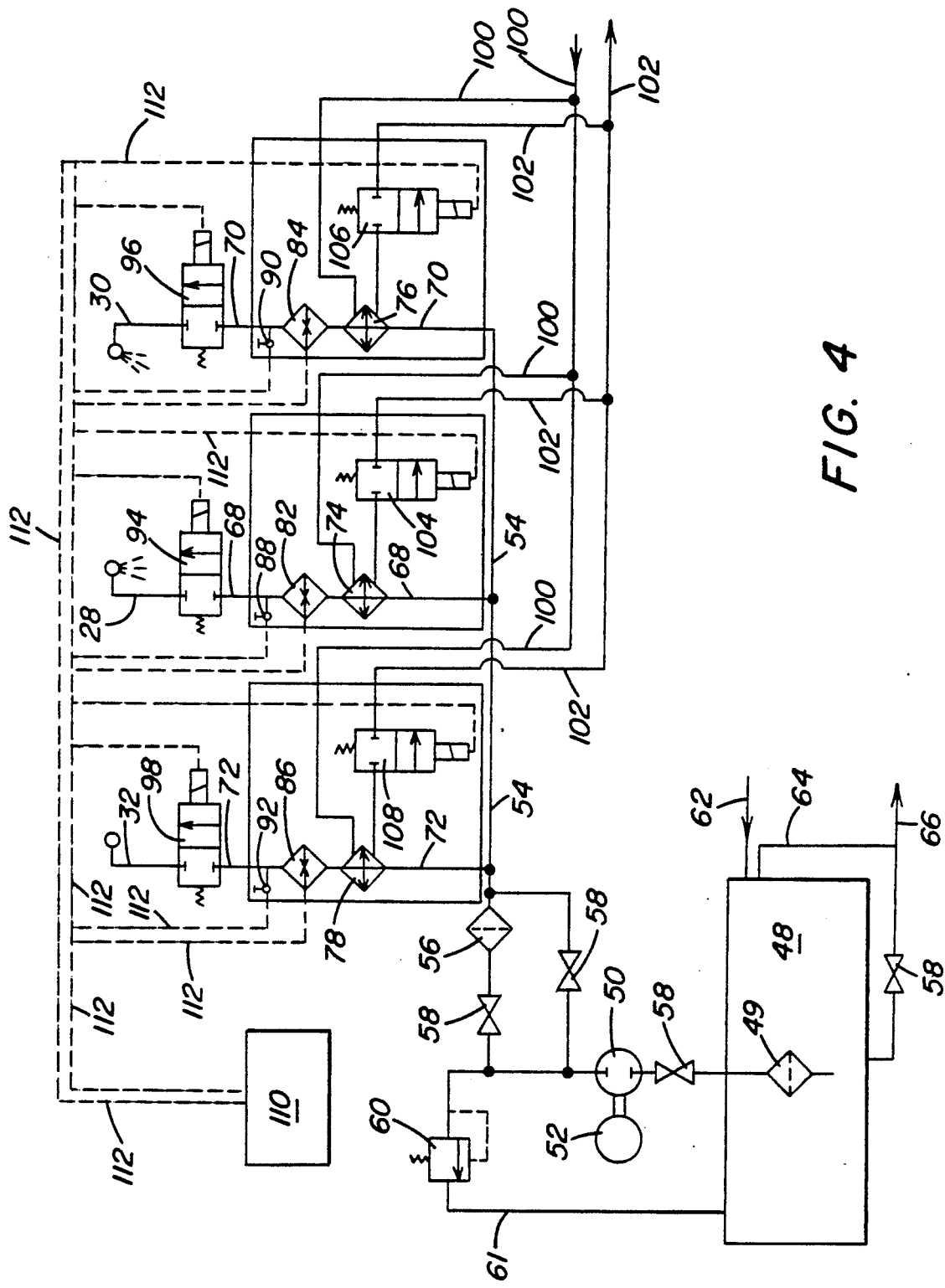
FIG. 4 is a schematic representation of the cooling liquid control system utilized in the apparatus of FIGS. 1-3, inclusive.

As seen in FIG. 4, cooling water from reservoir 48 is drawn through a suction screen 49 by a pump 50 driven by a motor 52. The pump 50 introduces the cooling water under pressure into a common manifold 54 through a filter 56. Appropriate shut-off valves 58 are provided to close and direct the water flow. A pressure relief valve 60 with a return line 61 to the reservoir prevents the pressure in common manifold 54 from becoming excessive. Filter 56 located between pump 50 and common manifold 54 insures that particulates will not pass into the common manifold 54.

To be sure that there is always sufficient water in reservoir 48 for cooling purposes, a make-up water line 62 delivers water to feservoir 48 in addition to the water returned to reservoir 48 through screen 24. An overflow line 64 from the reservoir communicates with a drain line 66 which may also permit draining of reservoir 48 through one of the shut-off valves 58.

The common manifold 54 communicates with a water line 68 that leads to the first plurality of sprays 28. The common manifold 54 also communicates with a water line 70 which leads to the second plurality of sprays 30 above the second inclined tray 22. A water line 72 communicates with the common manifold 54 and leads to the inlet conduit 32 at the inlet end 18 of inclined tray 16. Each of the lines 68, 70 and 72 has a heat exchanger 74, 76 and 78, respectively, located therein. Down stream from the respective heat exchangers 74, 76 and 78 the lines 68, 70 and 72 each have heaters 82, 84, and 86, respectively, positioned therein. Down stream from the respective heaters, line 68 has a thermocouple 88 communicating therewith, line 70 has a thermocouple 90, communicating therewith, and line 72 has a thermocouple 92 communicating therewith. Water quantity control valves 94, 96 and 98 are located in the respective lines 68, 70 and 72 downstream of the thermocouples 88, 90 and 92, respectively.

Each of the heat exchangers, 74, 76 and 78, have cooling water flowing through them from an inlet line 100 to a return drain line 102. The amount of cooling water flowing through heat exchanger 74 is controlled by a heat exchanger valve 104, the amount of cooling water passing through heat exchanger 76 is controlled by heat exchanger valve 106, and the amount of cooling water passing through heat exchanger 78 is controlled by valve 108.

A central micro-processor 110 is programmed to control the temperature of the water and the quantity of the water reaching the first plurality of sprays 28, the second plurality of sprays 30 and the water inlet conduit 32 to the first tray 16. The micro-processor 110 is connected by control lines and sensing lines 112 to the heat exchanger valves 104, 106 and 108; to the heaters 82, 84 and 86; to the thermocouples 88, 90 and 92; and to the water quantity valves 94, 96 and 98 so that the microprocessor can be programmed to control individually the amount and temperature of the water reaching the first plurality of sprays 28 above tray 16, the second plurality of sprays 30 above tray 22, and the inlet conduit 32.

With direct control by the central micro-processor 110 of all the components of the water control system, it may be seen that the operator of the apparatus may control the rate of cooling of the strands 11 by properly programming the microprocessor 110. The operator may check the temperature of the newly cut pellets emerging from the pelletizer 14 to determine if the strands are at the proper temperature when entering the pelletizer. The operator will also check the tackiness of the strands as they progress through the trays 16 and 22 to be sure that they are at a proper consistency. Programming of the microprocessor 110 for various types of plastic strands 11 that may be processed by the apparatus of the present invention will become routine once the perimeters of the micro-processor for the various types of material are known.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. Apparatus for providing controlled cooling of thermoplastic strands as they move to a pelletizer comprising:
    a first inclined tray receiving a plurality of side-by-side thermoplastic strands as said strands are discharged from an extruder, said first inclined tray being inclined downwardly away from said extruder;
    a second inclined tray in end-to-end relationship with said first inclined tray and extending upwardly from the lower end of said first inclined tray toward said pelletizer;
    hold down means at the intersection of said first and second trays to position said strands in said trays as said strands move down said first tray and then up said second tray;
    a pelletizer having means to pull thermoplastic strands through said first and second trays into said pelletizer where said pelletizer cuts said strands into pellets;
    a first plurality of cooling liquid sprays to spray cooling liquid onto said strands as they pass through said first tray;
    a second plurality of cooling liquid sprays to spray cooling liquid onto said strands as they pass through said second tray;
    said first plurality of sprays and said second plurality of sprays each utilizing cooling liquid whose temperature is independently controlled by a cooling liquid control system; and
    gravity cooling liquid removal means located in the low ends of said first and second inclined trays.

2. The apparatus of claim 1 wherein cooling liquid is introduced into said first tray below said strands and the temperature of said cooling liquid is independently controlled by said cooling liquid control system.

3. The apparatus of claim 2 wherein said cooling liquid is water.

4. The apparatus of claim 1 wherein the angle of inclination from horizontal of said first tray is from 3° to 15°, inclusive.

5. The apparatus of claim 1 wherein the angle of inclination from horizontal of said second tray is from 3° to 15°, inclusive.

6. The apparatus of claim 1 wherein said cooling liquid control system comprises a central micro-processor to control the temperature and quantity of cooling liquid emitted by said first plurality of cooling liquid sprays and by said second plurality of cooling liquid sprays.

7. The apparatus of claim 1 wherein said thermoplastic strands pass over means for providing an air stream to remove cooling liquid from said strands after leaving said second tray and before entering said pelletizer.

8. The apparatus of claim 1 wherein said first inclined tray is substantially wider at its inlet end where it receives said thermoplastic strands than at its outlet end where it joins to said second inclined tray.

9. The apparatus of claim 1 wherein said first plurality of cooling liquid sprays spray cooling liquid onto said strands in a direction substantially perpendicular to the movement of said strands and said second plurality of cooling liquid sprays spray cooling liquid onto said strands at an angle opposing the direction of travel of said strands in said second inclined tray.

10. Apparatus for providing controlled cooling of thermoplastic strands as they move to a pelletizer comprising:
    a first inclined tray receiving a plurality of side-by-side thermoplastic strands as said strands are discharged from an extruder, said first inclined tray being inclined downwardly away from said extruder at an angle of from 3° to 15°, inclusive, from the horizontal;
    a second inclined tray in end-to-end relationship with said first inclined tray and extending upwardly from the lower end of said first inclined tray toward said pelletizer at an angle of from 3° to 15°, inclusive, to the horizontal;
    hold down means at the intersection of said first and second trays to position said strands in said trays as said strands move down said first tray and then up said second tray;
    a pelletizer having means to pull said thermoplastic strands through said first and second trays into said pelletizer where said pelletizer cuts said strands into pellets;
    a first plurality of cooling liquid sprays to spray cooling liquid onto said strands as they pass through said first tray;
    a second plurality of cooling liquid sprays to spray cooling liquid onto said strands as they pass through said second tray;
    means for introducing cooling liquid into said first tray below said strands;
    said first plurality of sprays, said second plurality of sprays, and said means for introducing cooling liquid into said first tray each utilizing cooling liquid whose temperature is controlled independently by a cooling liquid control system;
    gravity cooling liquid removal means located in the low ends of said first and second inclined trays; and means located between said second inclined tray and said pelletizer for providing an air stream to remove cooling liquid from said strands.

11. The apparatus of claim 10 wherein said cooling liquid is water.

12. The apparatus of claim 10 wherein said cooling liquid control system comprises a central micro-processor to control the temperature and quantity of cooling liquid emitted by said first plurality of cooling liquid sprays, by said second plurality of cooling liquid sprays, and by said means for introducing cooling liquid into said first tray.

13. The apparatus of claim 10 wherein said first inclined tray is substantially wider at its inlet end where it receives said thermoplastic strands than at its outlet end where it joins to said second inclined tray.

14. The apparatus of claim 10 wherein said first plurality of cooling liquid sprays spray cooling liquid onto said strands in a direction substantially perpendicular to the movement of said strands and said second plurality of cooling liquid sprays spray cooling liquid onto said strands at an angle opposing the direction of travel of said strands in said second inclined tray.

15. The apparatus of claim 10 wherein said means for providing an air stream to remove cooling liquid from said strands comprises a screen supporting said strands with a vacuum pump creating a reduced atmospheric pressure below said screen whereby air flows from above said strands to the area of reduced pressure below said screen.

16. Apparatus for providing controlled cooling of thermoplastic strands as they move to a pelletizer comprising:
   a first inclined tray receiving a plurality of side-by-side thermoplastic strands as said strands are discharged from an extruder, said first inclined tray being inclined downwardly away from said extruder at an angle of from 3° to 15°, inclusive, from the horizontal and being substantially wider at its inlet end where it receives said thermoplastic strands than at its lower end;
   a second inclined tray in end-to-end relationship with said first inclined tray and extending upwardly from the lower end of said first inclined tray toward said pelletizer at an angle of from 3° to 15°, inclusive, to the horizontal;
   hold down means at the intersection of said first and second trays to position said strands in said trays as said strands move down said first tray and then up said second tray;
   a pelletizer having means to pull said thermoplastic strands through said first and second trays into said pelletizer where said pelletizer cuts said strands into pellets;
   a first plurality of water sprays to spray water onto said strands as they pass through said first tray, said first plurality of water sprays spraying water on said strands in a direction substantially perpendicular to the movement of said strands;
   a second plurality of water sprays to spray water onto said strands as they pass through said second tray, said second plurality of water sprays spraying water on said strands at an angle opposing the direction of travel of said strands;
   means for introducing water into said first tray below said strands;
   said first plurality of sprays, said second plurality of sprays, and said means for introducing water into said first tray each utilizing water whose quantity and temperature are controlled independently by a water control system, said water control system including a central microprocessor;
   a gravity water removal screen located in the low ends of said first and second inclined trays; and
   a screen supporting said strands between said second inclined tray and said pelletizer with a vacuum pump creating a reduced atmospheric pressure below said screen whereby air flows from above said strands to the area of reduced pressure below said screen thereby removing water from said strands.

17. The apparatus of claim 16 wherein said water control system comprises:
   a water reservoir;
   first water delivery conduits to deliver water from said reservoir to said first plurality of sprays;
   second water delivery conduits to deliver water from said reservoir to said second plurality of sprays;
   third water delivery conduits to deliver water from said reservoir to said means for introducing water to said first tray;
   separately controllable heat exchangers located in each of said first, second and third delivery conduits;
   separately controllable heaters located in each of said first, second and third delivery conduits;
   separately controllable water quantity control valves located in each of said first, second and third delivery conduits to control the quantity of water flowing therethrough;
   separate temperature responsive thermocouples located in said first, second and third delivery conduits to determine the water temperature therein;
   said central micro-processor being programmable to control individually said heat exchangers, said heaters and said water quantity control valves to control the temperature of the water in response to said thermocouples and to control the quantity of water flowing through each of said first, second and third delivery conduits by controlling said water quantity control valves.

18. The apparatus of claim 17 wherein said heat exchangers receive cooling water through valves that are controlled by said central micro-processor.

19. The apparatus of claim 17 wherein water is returned to said water reservoir after it passes through said gravity water removal screen.

20. The apparatus of claim 17 wherein water is returned to said water reservoir after it is drawn through said screen between said second tray and said pelletizer.

* * * * *